US012597642B2

(12) United States Patent
Lee et al.

(10) Patent No.: US 12,597,642 B2
(45) Date of Patent: Apr. 7, 2026

(54) ELECTROLYTE FOR LITHIUM SECONDARY BATTERY AND LITHIUM SECONDARY BATTERY COMPRISING SAME

(71) Applicant: LG ENERGY SOLUTION, LTD., Seoul (KR)

(72) Inventors: Dojoong Lee, Daejeon (KR); Kihyun Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 602 days.

(21) Appl. No.: 18/011,473

(22) PCT Filed: Dec. 16, 2021

(86) PCT No.: PCT/KR2021/019184
§ 371 (c)(1),
(2) Date: Dec. 19, 2022

(87) PCT Pub. No.: WO2022/149751
PCT Pub. Date: Jul. 14, 2022

(65) Prior Publication Data
US 2023/0318039 A1 Oct. 5, 2023

(30) Foreign Application Priority Data

Jan. 7, 2021 (KR) ........................ 10-2021-0001802

(51) Int. Cl.
H01M 10/0568 (2010.01)
H01M 4/38 (2006.01)
(Continued)

(52) U.S. Cl.
CPC ....... H01M 10/0568 (2013.01); H01M 4/382 (2013.01); H01M 4/582 (2013.01);
(Continued)

(58) Field of Classification Search
CPC ......... H01M 10/0568; H01M 10/0567; H01M 10/0569; H01M 4/382; H01M 4/582; H01M 2004/027; H01M 2300/0028
See application file for complete search history.

(56) References Cited

U.S. PATENT DOCUMENTS 6,537,701 B1 * 3/2003 Nimon .................. H01M 4/382
429/105
2003/0124433 A1 7/2003 Kim et al.
(Continued)

FOREIGN PATENT DOCUMENTS

CN 103367735 A 10/2013
CN 104934639 A 9/2015
(Continued)

OTHER PUBLICATIONS

CN104934639A. Sep. 23, 2015. English machine translation by EPO. (Year: 2015).*
(Continued)

*Primary Examiner* — James Lee
(74) *Attorney, Agent, or Firm* — Bryan Cave Leighton Paisner LLP

(57) ABSTRACT

Disclosed is an electrolyte solution for a lithium secondary battery capable of improving the lifetime of a lithium secondary battery, by including a certain amount of magnesium chloride (MgCl$_2$) in the electrolyte to form a stable electrode protective layer that prevents the consumption of salts and additives in the electrolyte solution, and a lithium secondary battery comprising the same. The electrolyte solution for the lithium secondary battery comprises a first solvent comprising a heterocyclic compound containing at least one of an oxygen atom and a sulfur atom; a second solvent comprising at least one of an ether-based compound, an ester-based compound, an amide-based compound, and a
(Continued)

carbonate-based compound; a lithium salt; magnesium chloride; and lithium nitrate.

11 Claims, 2 Drawing Sheets

(51) Int. Cl.
H01M 4/58 (2010.01)
H01M 10/0525 (2010.01)
H01M 10/0567 (2010.01)
H01M 10/0569 (2010.01)
*H01M 4/02* (2006.01)

(52) U.S. Cl.
CPC ... H01M 10/0567 (2013.01); H01M 10/0569 (2013.01); *H01M 2004/027* (2013.01); *H01M 2300/0028* (2013.01)

(56) References Cited

U.S. PATENT DOCUMENTS

| | | | |
|---|---|---|---|
| 2006/0019167 A1* | 1/2006 | Li | H01M 10/0561 |
| | | | 429/188 |
| 2014/0127594 A1 | 5/2014 | Nakayama et al. | |
| 2014/0170507 A1 | 6/2014 | Matsui et al. | |
| 2015/0188106 A1 | 7/2015 | Takeshi et al. | |
| 2016/0087311 A1 | 3/2016 | Doelle et al. | |
| 2017/0084953 A1 | 3/2017 | Smith et al. | |
| 2017/0149091 A1 | 5/2017 | Roev et al. | |
| 2018/0251681 A1* | 9/2018 | Zhang | H01M 10/0567 |
| 2023/0024232 A1 | 1/2023 | Wu et al. | |

FOREIGN PATENT DOCUMENTS

| | | | |
|---|---|---|---|
| CN | 113224387 A | 8/2021 |
| DE | 102013210631 A1 | 12/2014 |
| EP | 4044316 A1 | 8/2022 |
| JP | H10-308237 A | 11/1998 |
| JP | 2015-128028 A | 7/2015 |
| JP | 6087840 B2 | 3/2017 |
| JP | 2020-501314 A | 1/2020 |
| JP | 2022-550941 A | 12/2022 |
| JP | 2023-503043 A | 1/2023 |
| KR | 10-2003-0035521 A | 5/2003 |
| KR | 10-2014-0042673 A | 4/2014 |
| KR | 10-2015-0093121 A | 8/2015 |
| KR | 10-2016-0050221 A | 5/2016 |
| KR | 10-1771330 B1 | 8/2017 |
| KR | 10-1810758 B1 | 12/2017 |
| KR | 10-1811484 B1 | 12/2017 |
| KR | 10-2018-0090040 A | 8/2018 |
| KR | 10-2018-0115591 A | 10/2018 |
| KR | 10-2020-0076076 A | 6/2020 |
| KR | 20200061293 A | 6/2020 |
| WO | 2013/157187 A1 | 12/2015 |
| WO | 2017190355 A1 | 11/2017 |

OTHER PUBLICATIONS

Cabello et al., (2019), "On the Beneficial Effect of MgCl2 as Electrolyte Additive to Improve the Electrochemical Performance of Li4Ti5O12 as Cathode in Mg Batteries", Nanomaterials, vol. 9, 484, pp. 1-16.

Liang et al., (2017), "A Facile Surface Chemistry Route To A Stabilized Lithium Metal Anode", Nature Energy, vol. 2, Article No. 17119, pp. 1-7.

\* cited by examiner

【Figure 1】
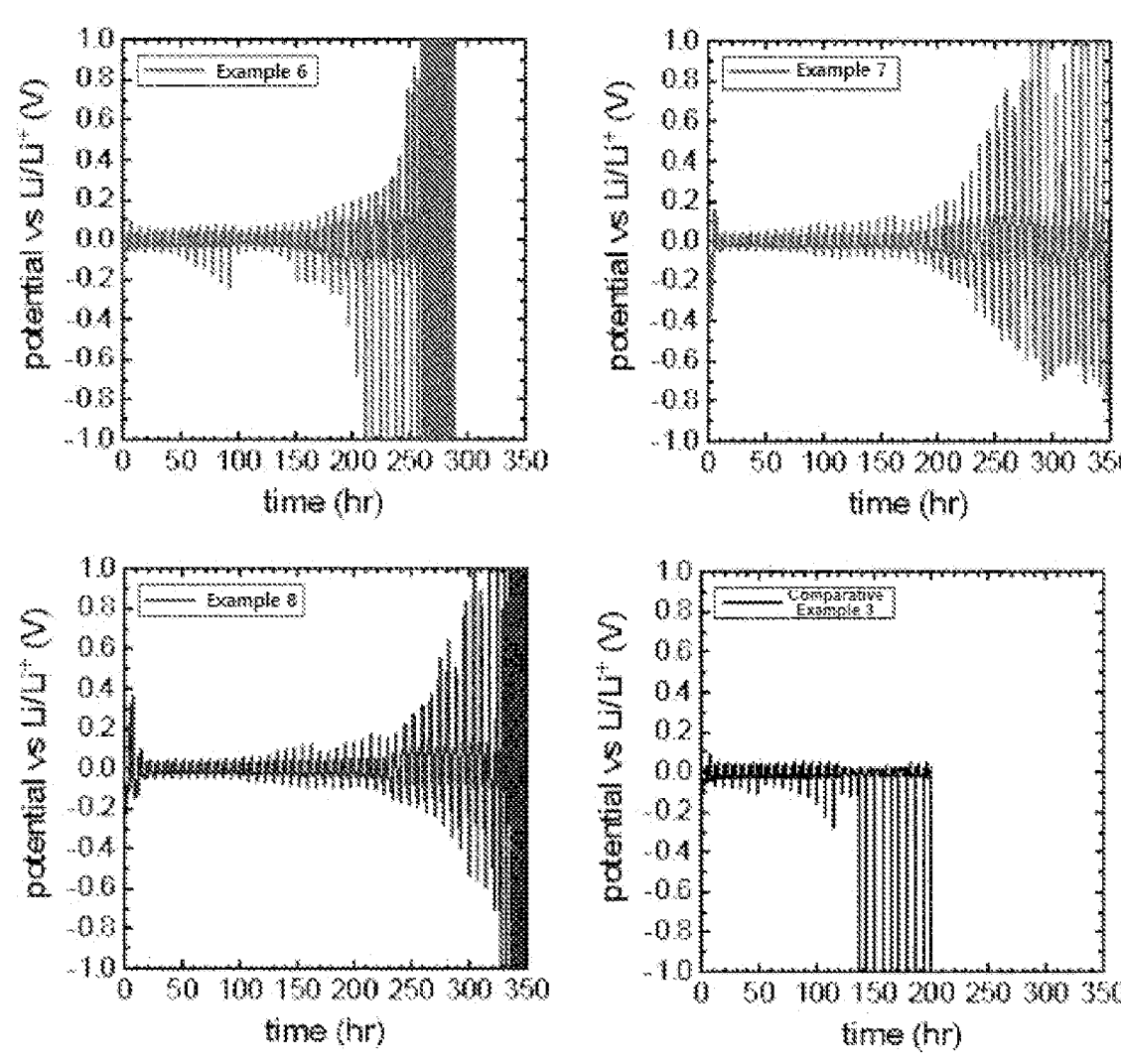

【Figure 2】
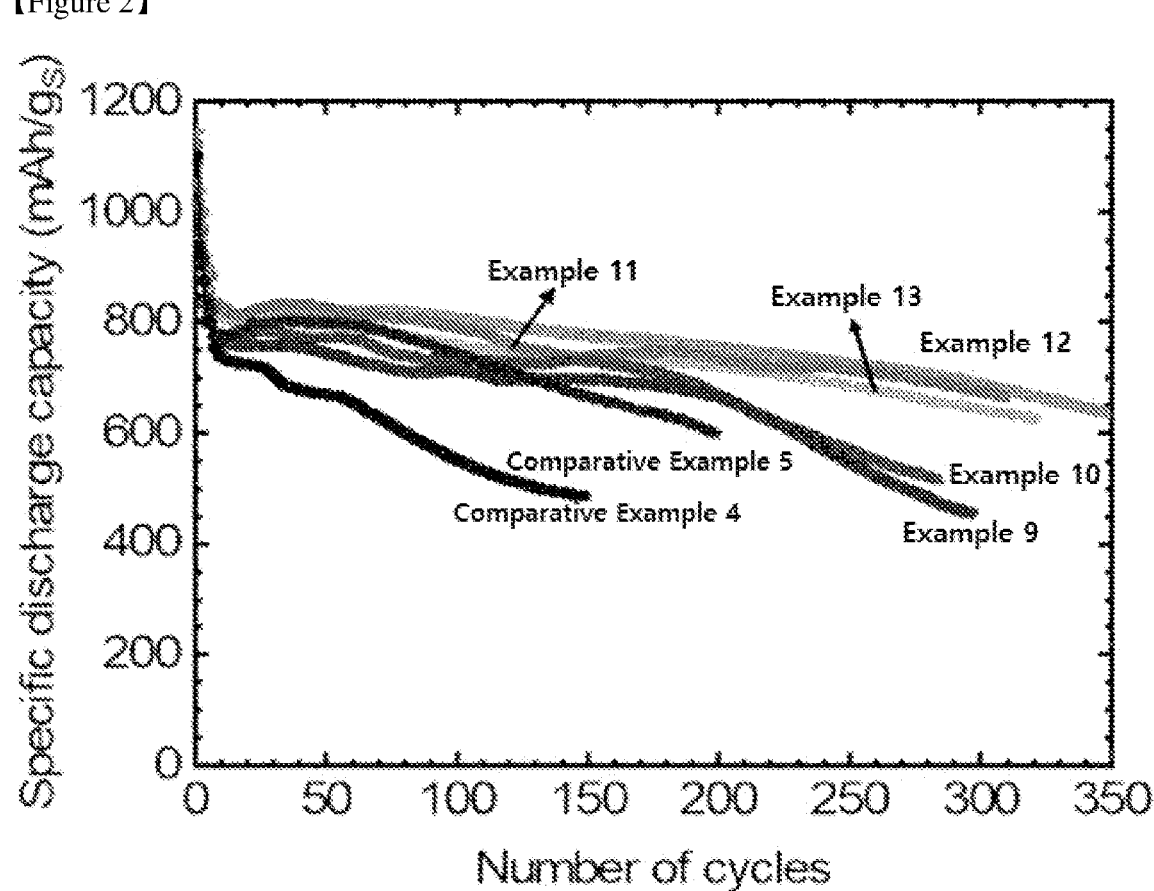

ELECTROLYTE FOR LITHIUM SECONDARY BATTERY AND LITHIUM SECONDARY BATTERY COMPRISING SAME

CROSS-REFERENCE TO RELATED APPLICATIONS

This application is a National Phase entry pursuant to 35 U.S.C. § 371 of International Application No. PCT/KR2021/019184, filed on Dec. 16, 2021, and claims the benefit of and priority to Korean Patent Application No. 10-2021-0001802, filed on Jan. 7, 2021, the disclosures of which are incorporated by reference in their entirety for all purposes as if fully set forth herein.

TECHNICAL FIELD

The present disclosure relates to an electrolyte solution for a lithium secondary battery and a lithium secondary battery comprising the same, and more particularly, to an electrolyte solution for a lithium secondary battery capable of improving the lifetime of a lithium secondary battery, by including a certain amount of magnesium chloride ($MgCl_2$) in the electrolyte to form a stable electrode protective layer that prevents the consumption of salts and additives in the electrolyte solution, and a lithium secondary battery comprising the same.

BACKGROUND

As interest in energy storage technology continues to increase, since its application is expanding from energy for mobile phones, tablets, laptops, and camcorders to even energy for electric vehicles (EVs) and hybrid electric vehicles (HEVs), research and development of electrochemical devices are gradually increasing. The field of electrochemical devices is an area that is receiving the most attention in this respect. Among them, the development of secondary batteries such as a lithium-sulfur battery capable of being charged/discharged has become a focus of attention. In recent years, in developing these batteries, in order to improve capacity density and specific energy, it has led to research and development in designs for new electrodes and batteries.

Among such electrochemical devices, a lithium metal secondary battery such as a lithium-sulfur battery (Li—S battery) not only uses light lithium metal as a negative electrode active material, but also has a high energy density (theoretical capacity: 3,862 mAh/g), and thus is in the spotlight as a next-generation high-capacity secondary battery that can replace conventional secondary batteries such as lithium-ion batteries. In such a lithium-sulfur battery, the reduction reaction of sulfur and the oxidation reaction of lithium metal take place during discharging, and at this time, sulfur forms lithium polysulfide (LiPS) having a linear structure from Ss having a cyclic structure. This lithium-sulfur battery is characterized by showing a stepwise discharging voltage until the polysulfide is completely reduced to $Li_2S$.

However, the biggest obstacle in the commercialization of the lithium-sulfur battery is lifetime, and during the charging/discharging process, the charging/discharging efficiency is reduced and the lifetime of the battery is deteriorated. The causes of such deterioration of the lifetime of the lithium-sulfur battery are various, such as the side reactions of the electrolyte solution (deposition of by-products due to the decomposition of the electrolyte solution), the instability of lithium metal (dendrite grows on the lithium negative electrode, causing a short circuit), and the deposition of positive electrode by-products (leaching of lithium polysulfide from the positive electrode).

That is, in a battery using a sulfur-based compound as a positive electrode active material and using an alkali metal such as lithium as a negative electrode active material, the leaching and shuttle phenomenon of lithium polysulfide occurs during charging/discharging, and the lithium polysulfide is transferred to the negative electrode, thereby reducing the capacity of the lithium-sulfur battery, and thus the lithium-sulfur battery has a major problem in that its lifetime is reduced and its reactivity is reduced. That is, since polysulfide leached from the positive electrode has high solubility in the organic electrolyte solution, it can undesirably move toward the negative electrode (PS shuttling) through the electrolyte solution. As a result, a decrease in capacity occurs due to irreversible loss of the positive electrode active material, and a decrease in the lifetime of the battery occurs due to deposition of sulfur particles on the surface of the lithium metal by side reactions.

In particular, lithium, which is a negative electrode active material, easily forms large-area dendrites and reacts with salts and additives in the electrolyte solution to form SEI (solid electrolyte interphase), thereby continuously consuming salts and additives in the electrolyte solution and as a result, promoting the degradation of the battery.

Meanwhile, the behavior of such a lithium-sulfur battery can vary greatly depending on the electrolyte solution. The electrolyte solution when sulfur in the positive electrode is leached into the electrolyte solution in the form of lithium polysulfide (LiPS) is called catholyte and the electrolyte solution when sulfur hardly leaches out in the form of lithium polysulfide is called sparingly soluble or solvating electrolyte (SSE). That is, in the art, various studies on a lithium-sulfur battery in which sulfur, a positive electrode active material, does not leach into the electrolyte solution (studies such as adding LiPS adsorption material to positive electrode composites or modifying separators made of existing PE, etc.) are being conducted, and in particular, studies on an electrolyte solution capable of proceeding a solid-to-solid reaction in which sulfur is converted to $Li_2S$, which is the final discharging product, are also being conducted, but it has not yet achieved such results. Accordingly, there is a need for a more fundamental method to suppress a phenomenon that lithium polysulfide moves to the negative electrode and thus decreases the lifetime of the lithium-sulfur battery and a phenomenon that the reactivity decreases due to a large amount of lithium polysulfide.

As a result, in this technical field, there are ongoing attempts to prevent the problem of side reactions of the electrolyte solution, but a fundamental solution is still difficult. Therefore, there is a need to develop an electrolyte solution for a lithium secondary battery that can improve the performance of a lithium secondary battery by forming a stable electrode protective layer that prevents the consumption of salts and additives in the electrolyte solution.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

Therefore, it is an object of the present disclosure to provide an electrolyte solution for a lithium secondary battery capable of improving the lifetime of a lithium secondary battery, by including a certain amount of magnesium chloride ($MgCl_2$) in the electrolyte to form a stable electrode protective layer that prevents the consumption of salts and additives in the electrolyte solution, and a lithium secondary battery comprising the same.

Technical Solution

In order to achieve the above object, the present disclosure provides an electrolyte solution for a lithium secondary battery, which comprises a first solvent comprising a heterocyclic compound containing at least one of an oxygen atom and a sulfur atom; a second solvent comprising at least one of an ether-based compound, an ester-based compound, an amide-based compound, and a carbonate-based compound; a lithium salt; magnesium chloride; and lithium nitrate.

In addition, the present disclosure provides a lithium secondary battery comprising a positive electrode; a lithium negative electrode; a separator between the positive electrode and the negative electrode; and the electrolyte solution for the lithium secondary battery.

Advantageous Effects

According to the electrolyte solution for the lithium secondary battery and the lithium secondary battery comprising the same according to the present disclosure, there is an advantage to improve the lifetime of the lithium secondary battery, by including a certain amount of magnesium chloride ($MgCl_2$) in the electrolyte to form a stable electrode protective layer that prevents the consumption of salts and additives in the electrolyte solution.

BRIEF DESCRIPTION OF DRAWINGS

FIG. 1 is a graph showing the cycle lifetime performance of lithium-lithium symmetric cells manufactured according to Examples of the present disclosure and Comparative Example.

FIG. 2 is a graph showing the cycle lifetime performance of lithium-sulfur batteries manufactured according to Examples of the present disclosure and Comparative Examples.

DETAILED DESCRIPTION

Hereinafter, the present disclosure will be described in detail.

The electrolyte solution for the lithium secondary battery according to the present disclosure comprises A) a first solvent comprising a heterocyclic compound containing at least one double bond or not, and containing at least one of an oxygen atom and a sulfur atom, B) a second solvent comprising at least one of an ether-based compound, an ester-based compound, an amide-based compound, and a carbonate-based compound, C) lithium salt, D) magnesium chloride, and E) lithium nitrate.

The electrolyte solution applicable to lithium secondary batteries such as a lithium-sulfur battery leads to differences in performance such as the lifetime or efficiency of the battery depending on the type of the solvent, the lithium salt and the additive contained in the electrolyte solution. Accordingly, after repeated research to improve the performance of the lithium secondary battery, the applicant of the present disclosure has discovered that the capacity and lifetime of the lithium secondary battery can be improved by combining the solvent, the lithium salt, and the additive (magnesium chloride, $MgCl_2$) contained in the electrolyte solution of the lithium secondary battery in an optimal ratio. In particular, it was designed to improve lithium charging/discharging efficiency and inhibit the growth of dendrites, by reacting magnesium chloride ($MgCl_2$) with the lithium negative electrode to form a LiCl protective layer and at the same time, form a lithium-friendly Li—Mg alloy on the surface of the negative electrode (i.e., increase the capacity of the battery by improving the usage efficiency of lithium).

Hereinafter, each of A) the first solvent, B) the second solvent, C) lithium salt, D) magnesium chloride, and E) lithium nitrate comprised in the electrolyte solution for the lithium secondary battery of the present disclosure will be described in detail.

A) First Solvent

The first solvent comprises a heterocyclic compound containing one or more double bonds or not, and containing any one of an oxygen atom and a sulfur atom, which has the property of being difficult to dissolve salts due to the delocalization of the lone pair electrons of the hetero atom (oxygen atom or sulfur atom), and thus can suppress the generation of lithium dendrites by forming a polymer protective film (solid electrolyte interface, SEI layer) on the surface of a lithium-based metal (negative electrode) by a ring opening reaction of a heterocyclic compound in the initial discharging stage of the battery, and can further improve the lifetime characteristics of the lithium-sulfur battery by reducing the decomposition of the electrolyte solution on the surface of lithium-based metal and subsequent side reactions.

That is, the heterocyclic compound of the present disclosure must contain one or more double bonds in order to form a polymeric protective film on the surface of a lithium-based metal, and must also contain one or more hetero atom (oxygen atom or sulfur atom) to exhibit an effect such as increasing the affinity with other solvents in the electrolyte solution by making it polar.

The heterocyclic compound may be a 3 to 15 membered, preferably 3 to 7 membered, more preferably 5 to 6 membered heterocyclic compounds. In addition, the heterocyclic compound may be a heterocyclic compound substituted or unsubstituted by at least one selected from the group consisting of an alkyl group having 1 to 4 carbon atoms, a cyclic alkyl group having 3 to 8 carbon atoms, an aryl group having 6 to 10 carbon atoms, a halogen group, a nitro group ($—NO_2$), an amine group ($—NH_2$), and a sulfonyl group ($—SO_2$). In addition, the heterocyclic compound may be a multicyclic compound of a heterocyclic compound and at least one of a cyclic alkyl group having 3 to 8 carbon atoms and an aryl group having 6 to 10 carbon atoms.

When the heterocyclic compound is substituted with an alkyl group having 1 to 4 carbon atoms, it is preferable because radicals are stabilized and side reactions between electrolyte solutions can be suppressed. In addition, when substituted with a halogen group or a nitro group, it is preferable because a functional passivation layer can be formed on the surface of a lithium-based metal, and at this time, the formed functional passivation layer is a compacted passivation layer, and thus has an advantage of being stable, enabling uniform deposition of the lithium-based metal and suppressing side reactions between the polysulfide and the lithium-based metal.

Specific examples of the heterocyclic compound may be 1,3-dioxolane, 4,5-diethyl-1,3-dioxolane, 4,5-dimethyl-1,3-dioxolane, 4-methyl-1,3-dioxolane, 4-ethyl-1,3-dioxolane, 1,3-dioxane, 1,4-dioxane, 4-methyl-1,3-dioxane and 2-methyl-1,3-dioxane, furan, 2-methylfuran, 3-methylfuran, 2-ethylfuran, 2-propylfuran, 2-butylfuran, 2,3-dimethyl-furan, 2,4-dimethylfuran, 2,5-dimethylfuran, pyran, 2-methylpyran, 3-methylpyran, 4-methylpyran, benzofuran, 2-(2-nitrovinyl) furan, thiophene, 2-methylthiophene, 2-ethylthiophene, 2-propylthiophene, 2-butylthiophene, 2,3-dimethylthiophene, 2,4-dimethylthiophene and 2,5-dimethylthiophene and the like. Among these, it is preferable to use 1,3-dioxolane as the first solvent, but is not limited thereto.

The first solvent comprising such a heterocyclic compound may be contained in 5 to 50 volume ratio, relative to 100 volume ratio of the total organic solvent (i.e., the first solvent+the second solvent) contained in the electrolyte solution for the lithium secondary battery of the present disclosure (the remaining volume ratio corresponds to the second solvent). If the first solvent is contained in less than 5 volume ratio relative to 100 volume ratio of the total organic solvent of the present disclosure, there may be a problem that the ability to reduce the leaching amount of the polysulfide decreases, and thus the increase in the resistance of the electrolyte solution cannot be suppressed, or the protective film is not completely formed on the surface of the lithium-based metal. In addition, if the first solvent is contained in an amount of more than 50 volume ratio relative to 100 volume ratio of the total organic solvent of the present disclosure, there is a concern that a problem of decreasing the capacity and lifetime of the battery may occur due to the increase in the surface resistance of the electrolyte solution and the lithium-based metal.

B) Second Solvent

The second solvent comprises at least one of an ether-based compound, an ester-based compound, an amide-based compound, and a carbonate-based compound, and not only dissolves the lithium salt to give the electrolyte solution a lithium ion conductivity, but also elutes sulfur, which is a positive electrode active material, so that the electrochemical reaction with lithium can proceed smoothly. In the case of the carbonate-based compound, it may be a linear carbonate-based compound or a cyclic carbonate-based compound.

Specific examples of the ether-based compound may be, but is not limited to, at least one selected from the group consisting of dimethyl ether, diethyl ether, dipropylether, methylethylether, methylpropylether, ethylpropylether, dimethoxyethane, diethoxyethane, methoxyethoxyethane, diethylene glycol dimethylether, diethylene glycol diethylether, diethylene glycol methylethylether, triethylene glycol dimethylether, triethylene glycol diethylether, triethylene glycol methylethylether, tetraethylene glycol dimethylether, tetraethylene glycol diethylether, tetraethylene glycol methylethylether, polyethylene glycol dimethylether, polyethylene glycol diethylether, and polyethylene glycol methylethylether. Among these, it is preferable to use dimethoxyethane as the second solvent.

In addition, the ester-based compound may be, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone. In addition, the amide-based compound may be a conventional amide-based compound used in the art.

In addition, the linear carbonate-based compound may be, but is not limited to, at least one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC).

In addition, the cyclic carbonate-based compound may be, but is not limited to, at least one selected from the group consisting of ethylene carbonate (ethylene carbonate, EC), propylene carbonate (propylene carbonate, PC), 1,2-butylene carbonate, 2,3-butylene carbonate, 1,2-pentylene carbonate, 2,3-pentylene carbonate, vinylene carbonate, vinylethylene carbonate, and halides thereof (fluoroethylene carbonate (FEC), etc.).

Meanwhile, if the second solvent is contained in less than an appropriate amount, there is a concern that the lithium ion conductivity decreases because the lithium salt cannot be sufficiently dissolved, and that sulfur, which is an active material, exceeds the concentration at which it can be dissolved, and thus a problem of precipitation may occur. If the second solvent is included in excess, there may be a problem that sulfur, which is an active material, is excessively leached, resulting in a severe shuttle phenomenon of lithium polysulfide and lithium negative electrode and a decrease in lifetime.

Meanwhile, the organic solvent containing the first solvent and the second solvent may be contained in an amount of 60 to 97 wt. %, preferably 65 to 95 wt. %, more preferably 70 to 95 wt. %, relative to the total weight of the electrolyte solution for the lithium secondary battery of the present disclosure. If the organic solvent is contained in an amount of less than 60 wt. % relative to the total weight of the electrolyte solution for the lithium secondary battery, there may be a problem that the viscosity of the electrolyte solution is increased and the ion conductivity is decreased or that the lithium salt or the additive is not completely dissolved in the electrolyte solution. If the organic solvent is contained in a content exceeding 97 wt. %, there may be a problem in that the concentration of lithium salt in the electrolyte solution is lowered, resulting in a decrease in ion conductivity.

C) Lithium Salt

The lithium salt is an electrolyte salt used to increase ion conductivity, and examples thereof may be at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (C$_2$F$_5$SO$_2$)$_2$NLi, (SO$_2$F)$_2$NLi (i.e., LiFSI), (CF$_3$SO$_2$)$_2$NLi (i.e., LiTFSI), (CF$_3$SO$_2$)$_3$CLi, lithium chloroborane, lithium lower aliphatic carboxylate having 4 or less carbon atoms, lithium 4-phenyl borate, and lithium imide.

The concentration of the lithium salt may be determined in consideration of ion conductivity and the like, and may be, for example, 0.2 to 2 M, preferably 0.5 to 1 M. If the concentration of the lithium salt is less than the above range, it may be difficult to secure ion conductivity suitable for operating a battery. If the concentration of the lithium salt exceeds the above range, as the viscosity of the electrolyte solution increases, the mobility of lithium ions decreases, or the decomposition reaction of the lithium salt itself increases, and thus the performance of the battery may be deteriorated.

D) Magnesium Chloride

The magnesium chloride (MgCl$_2$) reacts with the lithium negative electrode to form a LiCl protective layer on the surface of the negative electrode and at the same time, to form a lithium-friendly Li—Mg alloy, thereby improving lithium charging/discharging efficiency and suppressing the growth of dendrites, and ultimately contributes to increasing the capacity of the battery by improving the use efficiency of lithium.

It was confirmed that as described above, if magnesium chloride is used as an additive in the electrolyte solution, it is possible to overcome the low reactivity of lithium and magnesium chloride caused by the native oxide layer on the surface of the lithium negative electrode, and a LiCl protective layer and Li—Mg alloy may be formed on the surface of the lithium negative electrode, in which the native oxide layer on the surface of the lithium negative electrode is destroyed, during the initial charging/discharging.

The magnesium chloride may be contained in a content of 0.1 to 1 wt. %, preferably 0.5 to 1 wt. %, relative to the total weight of the electrolyte solution for the lithium secondary battery. If the magnesium chloride is contained in an amount of less than 0.1 wt. % based on the total weight of the electrolyte solution, the effect of lifetime improvement may be insignificant. If magnesium chloride is contained in an amount exceeding 1 wt. %, there may be a problem that the degradation of the battery is rather accelerated due to a side reaction between magnesium chloride and the positive electrode active material.

E) Lithium Nitrate

In addition, the electrolyte solution for the lithium secondary battery according to the present disclosure basically contains lithium nitrate ($LiNO_3$). Meanwhile, if necessary, the electrolyte solution may further contain one or more selected from the group consisting of lanthanum nitrate ($La(NO_3)_3$), potassium nitrate ($KNO_3$), cesium nitrate ($CsNO_3$), magnesium nitrate ($Mg(NO_3)_2$), barium nitrate ($Ba(NO_3)_2$), lithium nitrite ($LiNO_2$), potassium nitrite ($KNO_2$), and cesium nitrite ($CsNO_2$).

The lithium nitrate may be contained in a content of 0.1 to 7 wt. %, preferably 0.5 to 5 wt. %, relative to the total weight of the electrolyte solution for the lithium secondary battery. If the content of lithium nitrate is less than 0.1 wt. %, relative to the total weight of the electrolyte solution for the lithium secondary battery, the coulombic efficiency can be drastically reduced. If the content exceeds 7 wt. %, since the viscosity of the electrolyte solution is increased, it can be difficult to operate.

Next, the lithium secondary battery according to the present disclosure will be described. The lithium secondary battery comprises a positive electrode, a negative electrode, a separator interposed between the positive electrode and the negative electrode, and the electrolyte solution for the lithium secondary battery. The electrolyte solution for the lithium secondary battery comprises A) the first solvent, B) the second solvent, C) lithium salt, D) magnesium chloride, and E) lithium nitrate, as described above, and specific details thereof apply mutatis mutandis to those described above. In addition, the lithium secondary battery may be any lithium secondary battery commonly used in the art, and among them, a lithium-sulfur battery, and a lithium-lithium symmetric cell may be preferred.

Hereinafter, in the lithium secondary battery according to the present disclosure, the positive electrode, the negative electrode, and the separator will be described in more detail.

As described above, the positive electrode comprised in the lithium secondary battery of the present disclosure comprises a positive electrode active material, a binder, and an electrically conductive material. The positive electrode active material may be one that can be applied to a conventional lithium secondary battery, and for example may comprise lithium nickel cobalt manganese-based compound (lithium NCM-based compound), and also may comprise elemental sulfur (Ss), a sulfur-based compound, or a mixture thereof. Specifically, the sulfur-based compound may be $Li_2S_n$ ($n \geq 1$), an organosulfur compound or a carbon-sulfur composite (($(C_2S_x)_n$: x=2.5~50, n≥2), etc. In addition, the positive electrode active material may include a sulfur-carbon composite, and since the sulfur material alone does not have electrical conductivity, it may be used in combination with an electrically conductive material. The carbon material (or carbon source) constituting the sulfur-carbon composite may have a porous structure or a high specific surface area, and any carbon material may be used as long as it is commonly used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT), and multiwall carbon nanotubes (MWCNT); carbon fibers such as graphite nanofiber (GNF), carbon nanofiber (CNF), and activated carbon fiber (ACF); and activated carbon, and its shape may be spherical, rod-shaped, needle-shaped, plate-shaped, tubular or bulk-shaped, and it can be used without limitation as long as it is commonly used in a lithium secondary battery.

In addition, pores are formed in the carbon material, and the porosity of the pores is 40 to 90%, preferably 60 to 80%. If the porosity of the pores is less than 40%, since lithium ions are not transferred normally, they can act as a resistive component, thereby causing problems. If the porosity of the pores exceeds 90%, a problem of lowering the mechanical strength may occur. In addition, the pore size of the carbon material is 10 nm to 5 μm, preferably 50 nm to 5 μm. If the pore size is less than 10 nm, there may be a problem that lithium ions cannot be transmitted. If the pore size exceeds 5 μm, a short circuit of the battery due to contact between electrodes and safety problems may occur.

The binder is a component that assists in the bonding between a positive electrode active material and an electrically conductive material and the bonding to a current collector, and for example, may be, but is not necessarily limited to, at least one selected from the group consisting of polyvinylidenefluoride (PVdF), polyvinylidenefluoride-polyhexafluoropropylene copolymer (PVdF/HFP), polyvinylacetate, polyvinylalcohol, polyvinylether, polyethylene, polyethyleneoxide, alkylated polyethyleneoxide, polypropylene, polymethyl(meth)acrylate, polyethyl(meth)acrylate, polytetrafluoroethylene (PTFE), polyvinylchloride, polyacrylonitrile, polyvinylpyridine, polyvinylpyrrolidone, styrene-butadiene rubber, acrylonitrile-butadiene rubber, ethylene-propylene-diene monomer (EPDM) rubber, sulfonated EPDM rubber, styrene-butylene rubber, fluorine rubber, carboxymethylcellulose (CMC), starch, hydroxypropyl cellulose, regenerated cellulose, and mixtures thereof.

The binder is usually added in an amount of 1 to 50 parts by weight, preferably 3 to 15 parts by weight, based on 100 parts by weight of the total weight of the positive electrode. If the content of the binder is less than 1 part by weight, the adhesive strength between the positive electrode active material and the current collector may be insufficient. If the content of the binder exceeds 50 parts by weight, the adhesive strength is improved but the content of the positive electrode active material may be reduced accordingly, thereby lowering the capacity of the battery.

The electrically conductive material comprised in the positive electrode is not particularly limited as long as it does not cause side reactions in the internal environment of the battery and has excellent electrical conductivity while not causing chemical changes in the battery. The electrically conductive material may typically be graphite or electrically conductive carbon, and may be, for example, but is not necessarily limited to, one selected from the group consisting of graphite such as natural graphite or artificial graphite; carbon black such as carbon black, acetylene black, Ketjen black, Denka black, thermal black, channel black, furnace black, and lamp black; carbon-based materials whose crystal structure is graphene or graphite; electrically conductive fibers such as carbon fibers and metal fibers; carbon fluoride; metal powders such as aluminum powder and nickel powder; electrically conductive whiskers such as zinc oxide and potassium titanate; electrically conductive oxides such as titanium oxide; electrically conductive polymers such as polyphenylene derivatives; or a mixture of two or more thereof.

The electrically conductive material is typically added in an amount of 0.5 to 50 parts by weight, preferably 1 to 30 parts by weight based on 100 parts by weight of total weight of the positive electrode. If the content of electrically conductive material is too low, that is, if it is less than 0.5 parts by weight, it is difficult to obtain an effect on the improvement of the electrical conductivity, or the electrochemical characteristics of the battery may be deteriorated. If the content of the electrically conductive material exceeds 50 parts by weight, that is, if it is too much, the amount of positive electrode active material is relatively small and thus capacity and energy density may be lowered. The method of incorporating the electrically conductive material into the positive electrode is not particularly limited, and conventional methods known in the related art such as the coating on the positive electrode active material can be used. Also, if necessary, the addition of the second coating layer with electrical conductivity to the positive electrode active material may replace the addition of the electrically conductive material as described above.

In addition, a filler may be selectively added to the positive electrode of the present disclosure as a component for inhibiting the expansion of the positive electrode. Such a filler is not particularly limited as long as it can inhibit the expansion of the electrode without causing chemical changes in the battery, and examples thereof may comprise olefinic polymers such as polyethylene and polypropylene; fibrous materials such as glass fibers and carbon fibers.

The positive electrode active material, the binder, the electrically conductive material and the like are dispersed and mixed in a dispersion medium (solvent) to form a slurry, and the slurry can be applied onto the positive electrode current collector, followed by drying and rolling it to prepare a positive electrode. The dispersion medium may be, but is not limited to, N-methyl-2-pyrrolidone (NMP), dimethyl formamide (DMF), dimethyl sulfoxide (DMSO), ethanol, isopropanol, water, or a mixture thereof.

The positive electrode current collector may be, but is not necessarily limited to, platinum (Pt), gold (Au), palladium (Pd), iridium (Ir), silver (Ag), ruthenium (Ru), nickel (Ni), stainless steel (STS), aluminum (Al), molybdenum (Mo), chromium (Cr), carbon (C), titanium (Ti), tungsten (W), ITO (In doped $SnO_2$), FTO (F doped $SnO_2$), or an alloy thereof, or aluminum (Al) or stainless steel whose surface is treated with carbon (C), nickel (Ni), titanium (Ti), or silver (Ag) or so on. The shape of the positive electrode current collector may be in the form of a foil, film, sheet, punched form, porous body, foam or the like.

The negative electrode is a lithium-based metal, and may further include a current collector on one side of the lithium-based metal. The current collector may be a negative electrode current collector. The negative electrode current collector is not particularly limited as long as it has high electrical conductivity without causing chemical changes in the battery, and may be selected from the group consisting of copper, aluminum, stainless steel, zinc, titanium, silver, palladium, nickel, iron, chromium, and alloys and combinations thereof. The stainless steel can be surface-treated with carbon, nickel, titanium, or silver, and the alloy may be an aluminum-cadmium alloy. In addition, sintered carbon, a non-conductive polymer surface-treated with an electrically conductive material, or a conductive polymer may be used. In general, a thin copper plate is used as the negative electrode current collector.

In addition, the shape of the negative electrode current collector can be various forms such as a film having or not having fine irregularities on a surface, sheet, foil, net, porous body, foam, nonwoven fabric and the like. In addition, the negative electrode current collector is in the thickness range of 3 to 500 μm. If the thickness of the negative electrode current collector is less than 3 μm, the current collecting effect is lowered. On the other hand, if the thickness exceeds 500 μm, when folding and then assembling the cell, there is a problem that the workability is reduced.

The lithium-based metal may be lithium or a lithium alloy. In that case, the lithium alloy contains an element capable of alloying with lithium, and specifically the lithium alloy may be an alloy of lithium and at least one selected from the group consisting of Si, Sn, C, Pt, Ir, Ni, Cu, Ti, Na, K, Rb, Cs, Fr, Be, Mg, Ca, Sr, Sb, Pb, In, Zn, Ba, Ra, Ge, and Al.

The lithium-based metal may be in the form of a sheet or foil, and in some cases, may be in a form in which lithium or a lithium alloy is deposited or coated on a current collector by a dry process, or may be in a form in which metal and an alloy in a particle phase are deposited or coated by a wet process or the like.

A conventional separator may be interposed between the positive electrode and the negative electrode. The separator is a physical separator having a function of physically separating the electrodes, and can be used without particular limitation as long as it is used as a conventional separator, and particularly, a separator with low resistance to ion migration in the electrolyte solution and excellent impregnating ability for the electrolyte solution is preferable. In addition, the separator enables the transport of lithium ions between the positive electrode and the negative electrode while separating or insulating the positive electrode and the negative electrode from each other. The separator may be made of a porous, nonconductive, or insulating material. The separator may be an independent member such as a film or a coating layer added to the positive electrode and/or the negative electrode.

Examples of the polyolefin-based porous film which can be used as the separator may be films formed of any polymer alone selected from polyethylenes such as high-density polyethylene, linear low-density polyethylene, low-density polyethylene, and ultra-high molecular weight polyethylene, and polyolefin-based polymers such as polypropylene, polybutylene, and polypentene, or formed of a polymer mixture thereof. Examples of the nonwoven fabric that can be used as the separator is a nonwoven fabric formed by a polymer of polyphenyleneoxide, polyimide, polyamide, polycarbonate, polyethyleneterephthalate, polyethylenenaphthalate, polybutyleneterephthalate, polyphenylenesulfide, polyacetal, polyethersulfone, polyetheretherketone, polyester and the like alone or a mixture thereof. Such nonwoven fabrics include a nonwoven fabric in the form of a fiber to form a porous web, that is, a spunbond or a meltblown nonwoven fabric composed of long fibers.

The thickness of the separator is not particularly limited, but is preferably in the range of 1 to 100 μm, more preferably 5 to 50 μm. If the thickness of the separator is less than 1 μm, the mechanical properties cannot be maintained. If the thickness of the separator exceeds 100 μm, the separator acts as a resistive layer, thereby deteriorating the performance of the battery. The pore size and porosity of the separator are not particularly limited, but it is preferable that the pore size is 0.1 to 50 μm and the porosity is 10 to 95%. If the separator has a pore size of less than 0.1 μm or a porosity of less than 10%, the separator acts as a resistive layer. If the separator has a pore size exceeding 50 μm or a porosity exceeding 95%, mechanical properties cannot be maintained.

The lithium secondary battery of the present disclosure comprising the positive electrode, the negative electrode, separator, and the electrolyte solution as described above may be manufactured through a process of making the positive electrode face the negative electrode, and interposing a separator therebetween and then injecting the electrolyte solution for the lithium secondary battery according to the present disclosure.

Meanwhile, the lithium secondary battery according to the present disclosure can be not only applicable to a battery cell used as a power source of a small device, but also can be particularly suitably usable as a unit battery of a battery module which is a power source of a medium and large-sized device. In this respect, the present disclosure also tric trucks; electric commercial vehicles; or power storage systems, but the present disclosure is not limited thereto.

Hereinafter, preferred examples are provided to help understanding of the present disclosure, but the following examples are only for exemplifying the present disclosure, and it is apparent to those skilled in the art that various changes and modifications can be made within the scope and spirit of the present disclosure, and such changes and modifications are within the scope of the appended claims.

[Example 1] Preparation of Electrolyte Solution for Lithium Secondary Battery

First, to an organic solvent obtained by mixing 1,3-dioxolane (first solvent) and dimethoxyethane (second solvent) in a 1:1 volume ratio (v/v), 1 wt. % of lithium nitrate ($LiNO_3$) and 0.1 wt. % of magnesium chloride based on the total weight of the electrolyte solution were added, and dissolved, so that the concentration of LiTFSI (lithium salt) was IM, to prepare an electrolyte solution for a lithium secondary battery.

[Examples 2 to 5 and Comparative Examples 1 and 2] Preparation of Electrolyte Solution for Lithium Secondary Battery Electrolyte solutions for the lithium secondary battery corresponding to Examples 2 to 5 and Comparative Examples 1 and 2 were prepared in the same manner as in Example 1, respectively, except that the components were changed as shown in Table 1 below.

TABLE 1

| | Electrolyte solution | | | | |
| | First solvent | Second solvent | Lithium salt | $MgCl_2$ | Lithium nitrate |
|---|---|---|---|---|---|
| Example 1 | 1,3-dioxolane 50% | dimethoxyethane 50% | LiTFSI 1M | 0.1 wt. % | 1 wt. % |
| Example 2 | 1,3-dioxolane 50% | dimethoxyethane 50% | LITFSI 1M | 0.3 wt. % | 1 wt. % |
| Example 3 | 1,3-dioxolane 50% | dimethoxyethane 50% | LiTFSI 1M | 0.5 wt .% | 1 wt. % |
| Example 4 | 1,3-dioxolane 50% | dimethoxyethane 50% | LITFSI 1M | 0.8 wt. % | 1 wt. % |
| Example 5 | 1,3-dioxolane 50% | dimethoxyethane 50% | LITFSI 1M | 1 wt. % | 1 wt. % |
| Comparative Example 1 | 1,3-dioxolane 50% | dimethoxyethane 50% | LiTFSI 1M | — | 1 wt. % |
| Comparative Example 2 | 1,3-dioxolane 50% | dimethoxyethane 50% | LITFSI 1M | 1.2 wt. % | 1 wt. % | provides a battery module in which at least two lithium secondary batteries are electrically connected (in series or in parallel). It is needless to say that the number of lithium secondary batteries comprised in the battery module may be variously adjusted in consideration of the use and capacity of the battery module. In addition, the present disclosure provides a battery pack in which the battery modules are electrically connected according to a conventional technique in the art. The battery module and the battery pack may be used as a power source for at least one medium and large-sized device selected from power tools; electric cars comprising an electric vehicle (EV), a hybrid electric vehicle (HEV), and a plug-in hybrid electric vehicle (PHEV); elec-

[Examples 6 to 8 and Comparative Example 3] Manufacture of Lithium-Lithium Symmetric Cell 35 μm-thick lithium was rolled on one side of copper current collectors to prepare two electrodes, and these were used as a positive electrode and a negative electrode, respectively, and at this time, sides of the lithium were positioned to face each other. Subsequently, after interposing a porous polyethylene (PE) separator between the positive electrode and the negative electrode, the electrolyte solutions prepared in Examples 1, 3, 5, and Comparative Example 1 were respectively injected and sealed to manufacture coin cell-type lithium-lithium symmetric cells.

[Experimental Example 1] Evaluation of Cycle
Lifetime of Lithium-Lithium Symmetric Cell For the lithium-lithium symmetric cells prepared in
Examples 6 to 8 and Comparative Example 3, the discharg-
ing (−1V lower limit) and charging (+1V upper limit) cycles
were repeated at a temperature of 25° C. and a current
density of 1.0 mA/cm² to measure the potential over time
(cycle), and the results are shown in Table 2 below and FIG.
1.

TABLE 2

| | MgCl₂ content in electrolyte solution | Lifetime (Cycle) [Based on reaching 1 V or −1 V] |
|---|---|---|
| Example 6 | 0.1 wt. % | 29 |
| Example 7 | 0.5 wt. % | 49 |
| Example 8 | 1 wt. % | 51 |
| Comparative Example 3 | — | 19 |

FIG. 1 is graphs showing the cycle lifetime performance
of lithium-lithium symmetric cells manufactured according
to Examples of the present disclosure and Comparative
Example. As shown in FIG. 1 and Table 2 above, it was
confirmed that all of the lithium-lithium symmetric cells of
Examples 6 to 8 containing magnesium chloride (MgCl₂) in
the electrolyte solution had improved lifetime compared to
the lithium-lithium symmetric cell of Comparative Example
3 that did not contain magnesium chloride in the electrolyte
solution. In addition, through the evaluation of the cycle
lifetime of Examples 6 to 8, it was confirmed that the
lifetime of the lithium-lithium symmetric cell was further
improved as the content of magnesium chloride in the
electrolyte solution was increased.

[Examples 9 to 13 and Comparative Examples 4
and 5] Manufacture of Lithium-Sulfur Battery First, 87.5 parts by weight of sulfur-carbon (CNT) com-
posite (S/C 75:25 weight ratio) as a positive electrode active
material, 5 parts by weight of Denka black as an electrically
conductive material, and 7.5 parts by weight of styrene
butadiene rubber/carboxymethyl cellulose (SBR/CMC 7:3)
as a binder were mixed to prepare a slurry composition for
a positive electrode, and then the prepared slurry composi-
tion was coated on a current collector (Al Foil), dried at 80°
C. for 12 hours, and pressed by a roll press machine to
manufacture a positive electrode (at this time, the loading
amount was 2.9 mg/cm²). Subsequently, the prepared posi-
tive electrode and the negative electrode negative electrode
with 35 μm-thick lithium rolled on one side of a copper
current collector were positioned to face each other, a porous
polyethylene (PE) separator was interposed therebetween,
and then the electrolyte solutions prepared in Examples 1 to
5 and Comparative Examples 1 and 2 were respectively
injected and sealed to manufacture coin cell-type lithium-
sulfur batteries.

[Experimental Example 2] Evaluation of Cycle
Lifetime of Lithium-Sulfur Battery

For the lithium-sulfur batteries prepared in Examples 9 to
13 and Comparative Examples 4 and 5, 0.2C charging/0.3C
discharging cycles were performed in the CC mode at a
temperature of 25° C. in a voltage section between 1.8V and
2.5V to measure the capacity-potential according to the charging/discharging cycle (after the initial stabilization
process of 2.5 cycles at 0.1C/0.1C and 3 cycles at 0.2C/0.2C,
the operation at 0.3C/0.5C was performed from the 7th
cycle), and the results are shown in Table 3 below and FIG.
2.

TABLE 3

| | MgCl₂ content in electrolyte solution | Lifetime (Cycles) [based on discharging capacity 80%] | Discharging capacity (mAh/g_s) [7th cycle, 0.3 C/ 0.5 C] |
|---|---|---|---|
| Example 9 | 0.1 wt. % | 218 | 771 |
| Example 10 | 0.3 wt. % | 222 | 780 |
| Example 11 | 0.5 wt. % | 307 | 836 |
| Example 12 | 0.8 wt. % | 322 | 833 |
| Example 13 | 1 wt. % | 294 | 811 |
| Comparative Example 4 | — | 78 | 755 |
| Comparative Example 5 | 1.2 wt. % | 186 | 778 |

FIG. 2 is a graph showing the cycle lifetime performance
of lithium-sulfur batteries manufactured according to
Examples of the present disclosure and Comparative
Examples. As shown in FIG. 2 and Table 3 above, it was
confirmed that all of the lithium-sulfur batteries of Examples
9 to 13 containing magnesium chloride (MgCl₂) in the
electrolyte solution had improved lifetime compared to the
lithium-sulfur batteries of Comparative Example 4 that did
not contain magnesium chloride in the electrolyte solution.

In addition, it was confirmed that although magnesium
chloride is equally contained in the electrolyte solution, if
the content exceeds 1 wt. % (Comparative Example 5), the
lifetime performance is lower than that of the lithium-sulfur
batteries of Examples 9 to 13 using magnesium chloride
within the content range (0.1 to 1 wt. %) of the present
disclosure. This is due to the rapid deterioration of the
battery due to the side reaction between magnesium chloride
and the positive electrode active material (sulfur). Accord-
ingly, it can be seen that even if magnesium chloride is used
as an electrolyte solution additive, the object of the present
disclosure can be achieved only when used in an appropriate
amount.

The invention claimed is:
1. An electrolyte solution for a lithium secondary battery,
comprising,
  a first solvent comprising a heterocyclic compound con-
    taining at least one of an oxygen atom or a sulfur atom;
  a second solvent comprising at least one of an ether-based
    compound, an ester-based compound, an amide-based
    compound, or a carbonate-based compound;
  a lithium salt;
  magnesium chloride; and
  lithium nitrate,
  wherein the magnesium chloride is contained in an
    amount of 0.5 to 1 wt. %, relative to the total weight of
    the electrolyte solution, and
  wherein the lithium secondary battery is a lithium-sulfur
    battery.
2. The electrolyte solution for the lithium secondary
battery according to claim 1, wherein the lithium salt com-
prises at least one selected from the group consisting of
LiCl, LiBr, LiI, LiClO₄, LiBF₄, LiB₁₀Cl₁₀, LiPF₆,
LiCF₃SO₃, LiCF₃CO₂, LiC₄BO₈, LiAsF₆, LiSbF₆, LiAlCl₄,
CH₃SO₃Li, CF₃SO₃Li, (C₂F₅SO₂)₂NLi, (SO₂F)₂NLi,
(CF₃SO₂)₂NLi, (CF₃SO₂)₃CLi, lithium chloroborane, lithium lower aliphatic carboxylate having 4 or less carbon atoms, lithium tetraphenyl borate, and lithium imide.

3. The electrolyte solution for the lithium secondary battery according to claim 1, wherein a concentration of the lithium salt is 0.2 to 2.0 M.

4. The electrolyte solution for the lithium secondary battery according to claim 1, wherein the heterocyclic compound is:

a 3 to 15 membered heterocyclic compound unsubstituted or substituted with at least one selected from the group consisting of an alkyl group having 1 to 4 carbon atoms, a cyclic alkyl group having 3 to 8 carbon atoms, an aryl group having 6 to 10 carbon atoms, a halogen group, a nitro group, an amine group, and a sulfonyl group, or a multicyclic compound of a heterocyclic compound and at least one of a cyclic alkyl group having 3 to 8 carbon atoms and an aryl group having 6 to 10 carbon atoms.

5. The electrolyte solution for the lithium secondary battery according to claim 1, wherein the heterocyclic compound is selected from the group consisting of 1,3-dioxolane, 4,5-diethyl-1,3-dioxolane, 4,5-dimethyl-1,3-dioxolane, 4-methyl-1,3-dioxolane, 4-ethyl-1,3-dioxolane, 1,3-dioxane, 1,4-dioxane, 4-methyl-1,3-dioxane and 2-methyl-1,3-dioxane, furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl) furan, thiophene, 2-methylthiophene, 2-ethylthiophene, 2-propylthiophene, 2-butylthiophene, 2,3-dimethylthiophene, 2,4-dimethylthiophene and 2,5-dimethylthiophene.

6. The electrolyte solution for the lithium secondary battery according to claim 1, wherein the ether-based compound of the second solvent is at least one selected from the group consisting of dimethyl ether, diethyl ether, dipropylether, methylethylether, methylpropylether, ethylpropylether, dimethoxyethane, diethoxyethane, methoxyethoxyethane, diethylene glycol dimethylether, diethylene glycol diethylether, diethylene glycol methylethylether, triethylene glycol dimethylether, triethylene glycol diethylether, triethylene glycol methylethylether, tetraethylene glycol dimethylether, tetraethylene glycol diethylether, tetraethylene glycol methylethylether, polyethylene glycol dimethylether, polyethylene glycol diethylether and polyethylene glycol methylethylether.

7. The electrolyte solution for the lithium secondary battery according to claim 1, further comprising at least one selected from the group consisting of lanthanum nitrate, potassium nitrate, cesium nitrate, magnesium nitrate, barium nitrate, lithium nitrite, potassium nitrite and cesium nitrite.

8. The electrolyte solution for the lithium secondary battery according to claim 1, wherein the first solvent is 1,3-dioxolane, the second solvent is dimethoxyethane, and the lithium salt is LiTFSI.

9. The electrolyte solution for a lithium secondary battery according to claim 1, wherein the heterocyclic compound contains at least one double bond.

10. A lithium-sulfur battery, comprising:
a positive electrode;
a lithium negative electrode;
a separator between the positive electrode and the negative electrode; and
the electrolyte solution of claim 1.

11. The lithium-sulfur battery according to claim 10, wherein the lithium-sulfur battery comprises a LiCl protective layer and a Li—Mg alloy on a surface of the lithium negative electrode after initial charging and discharging of the lithium-sulfur battery.

* * * * *